(12) United States Patent
Chiu

(10) Patent No.: US 7,702,360 B2
(45) Date of Patent: Apr. 20, 2010

(54) COMMUNICATION SYSTEM EQUIPPED WITH A SHARED ANTENNA AND EXPANSION CARD THEREOF

(75) Inventor: Wei-Chuan Chiu, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 441 days.

(21) Appl. No.: 11/802,704

(22) Filed: May 24, 2007

(65) Prior Publication Data
US 2007/0298714 A1 Dec. 27, 2007

(30) Foreign Application Priority Data
Jun. 23, 2006 (TW) .............................. 95122655 A

(51) Int. Cl.
*H04B 7/00* (2006.01)
(52) U.S. Cl. .................................... 455/552.1; 455/558
(58) Field of Classification Search ................ 455/41.2, 455/78, 80, 550.1, 552.1, 553.1, 557, 558, 455/575.1, 101
See application file for complete search history.

(56) References Cited
U.S. PATENT DOCUMENTS
6,628,236 B2 9/2003 Kim

2003/0050032 A1 3/2003 Masaki
2008/0064436 A1 * 3/2008 Kim ........................ 455/552.1
2008/0227485 A1 * 9/2008 Kim ........................ 455/552.1

FOREIGN PATENT DOCUMENTS

| CN | 1741484 A | 3/2006 |
|---|---|---|
| TW | 479385 | 3/2002 |
| TW | 532020 | 5/2003 |
| TW | M260886 | 4/2005 |
| TW | I255613 | 5/2006 |

\* cited by examiner

*Primary Examiner*—Thanh C Le
(74) *Attorney, Agent, or Firm*—Winston Hsu

(57) ABSTRACT

A communication system equipped with a shared antenna includes an antenna, a first communication module, a second communication module, and a switch unit. The first communication module processes a first communication signal and transmits the first communication signal to the switch unit. The second communication module processes a second communication signal and transmits the second communication signal to the switch unit. Additionally, the first communication module controls the switch unit to transmit the first communication signal or the second communication signal to the antenna, and the antenna emits the first communication signal or the second communication signal.

14 Claims, 8 Drawing Sheets

COMMUNICATION SYSTEM EQUIPPED WITH A SHARED ANTENNA AND EXPANSION CARD THEREOF

BACKGROUND OF THE INVENTION

1. Field of the Invention

The present invention relates to a communication system, and more particularly to a communication system equipped with an antenna shared by a Bluetooth module and a wireless network module.

2. Description of the Prior Art

FIG. 1 illustrates a diagram of a convention wireless network module 100. The wireless network module 100 includes a baseband/multimedia access control (BB/MAC) 130, a front end module (FEM) 120, a main antenna 160, and an auxiliary antenna 170.

The above-mentioned wireless network module 100 is manufactured compliant to the 802.11b/g IEEE standards that transmit wireless network signals 140 at a bandwidth of 2.4 GHz. The main antenna 160 and the auxiliary antenna 170 are coupled to the FEM 120, and the FEM 120 is coupled to the BB/MAC 130. The FEM 120 is utilized for converting the digital signals 150 transmitted from the BB/MAC 130 to wireless network signals 140 to be transmitted by the main antenna 160 or the auxiliary antenna 170.

When the wireless network module 100 is transmitting the wireless network signals 140, the wireless network module 100 selects an antenna to be a transmission antenna according to the reception of the main antenna 160 or the auxiliary antenna 170, the transmission antenna becomes a diversity antenna. In other words, there is usually a predetermined distance set between positions of the main antenna 160 and the auxiliary antenna 170, thus the wireless network module 100 can gain better reception through the inter-compensation of the main antenna 160 and the auxiliary antenna 170. Therefore when the main antenna 160 has better reception, the wireless network module 100 will transmit the wireless network signals 140 through the main antenna 160; and if the auxiliary antenna 170 has better reception, the wireless network module 100 will transmit the wireless network signals 140 through the auxiliary antenna 170.

FIG. 2 illustrates a diagram of a conventional Bluetooth module 200. The Bluetooth module 200 includes a Bluetooth antenna 210 for transmitting Bluetooth signals 220, wherein Bluetooth signals 220 transmitted by the Bluetooth module 200 also operate in the bandwidth of 2.4 GHz.

In general, the current wireless network module and the Bluetooth module are respectively installed on two different printed circuit boards. For example, the wireless network cards sold in the market only provide either a wireless network module or a Bluetooth module. Therefore, in consideration for an end-user, to utilize both wireless network transmission and Bluetooth transmission at the same time requires additional expenses and inconvenience is caused, especially when the two wireless network cards are of different standards.

At the moment, some mobile phones in the market have the wireless network module and the Bluetooth module installed on the printed circuit board of the mobile phone. In other words, the wireless network module and the Bluetooth module are installed on the same printed circuit board. However, the resulting efficiency will be poor as the wireless network module of this design only utilizes a single antenna, and the Bluetooth module utilizes a chip antenna.

SUMMARY OF THE INVENTION

The claimed invention provides a communication system and an expansion board equipped with a shared antenna to solve the above-mentioned problem.

The claimed invention discloses an expansion board suitable for cooperating to a first antenna on a portable electronic device. The expansion board comprises a first communication module for processing a first communication signal; a second communication module for processing a second communication signal; and a switch unit respectively coupled to the first communication module and the second communication module, wherein when the expansion card is inserted to the portable electronic device, the switch unit is coupled to the first antenna, and the switch unit switches the first communication module or the second communication module through the first antenna to transit the first communication signal or the second communication signal.

The claimed invention further discloses a communication system with a shared antenna. The communication system comprises a shared antenna; a first communication module for processing a first communication signal; a second communication module coupled to the first communication module for processing a second communication signal and for receiving a first control signal transmitted from the first communication module; and a switch unit. The switch unit comprises a first transmission end coupled to the first communication module for transmitting the first communication signal; a second transmission end coupled to the second communication module for transmitting the second communication signal; a first control end coupled to the first communication module for receiving the first control signal transmitted from the first communication module; and a third transmission end coupled to the shard antenna for coupling to the first transmission end or the second transmission end according to the first control signal.

The claimed invention further discloses a communication system with a shared antenna, the communication system comprises a first antenna; a first communication module for processing a first communication signal; a second communication module for processing a second communication signal; a second shared antenna coupled to the second communication module for transmitting the second communication signal; and a switch unit. The switch unit comprises a first transmitting end coupled to the first communication module for transmitting the first communication signal; a second transmitting end coupled to the second communication module for transmitting the second communication signal; a first control end coupled to the first communication module for receiving the first control signal transmitted from the first communication module; and a third transmitting end coupled to the first antenna for coupling to the first transmission end or the second transmission end according to the first control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
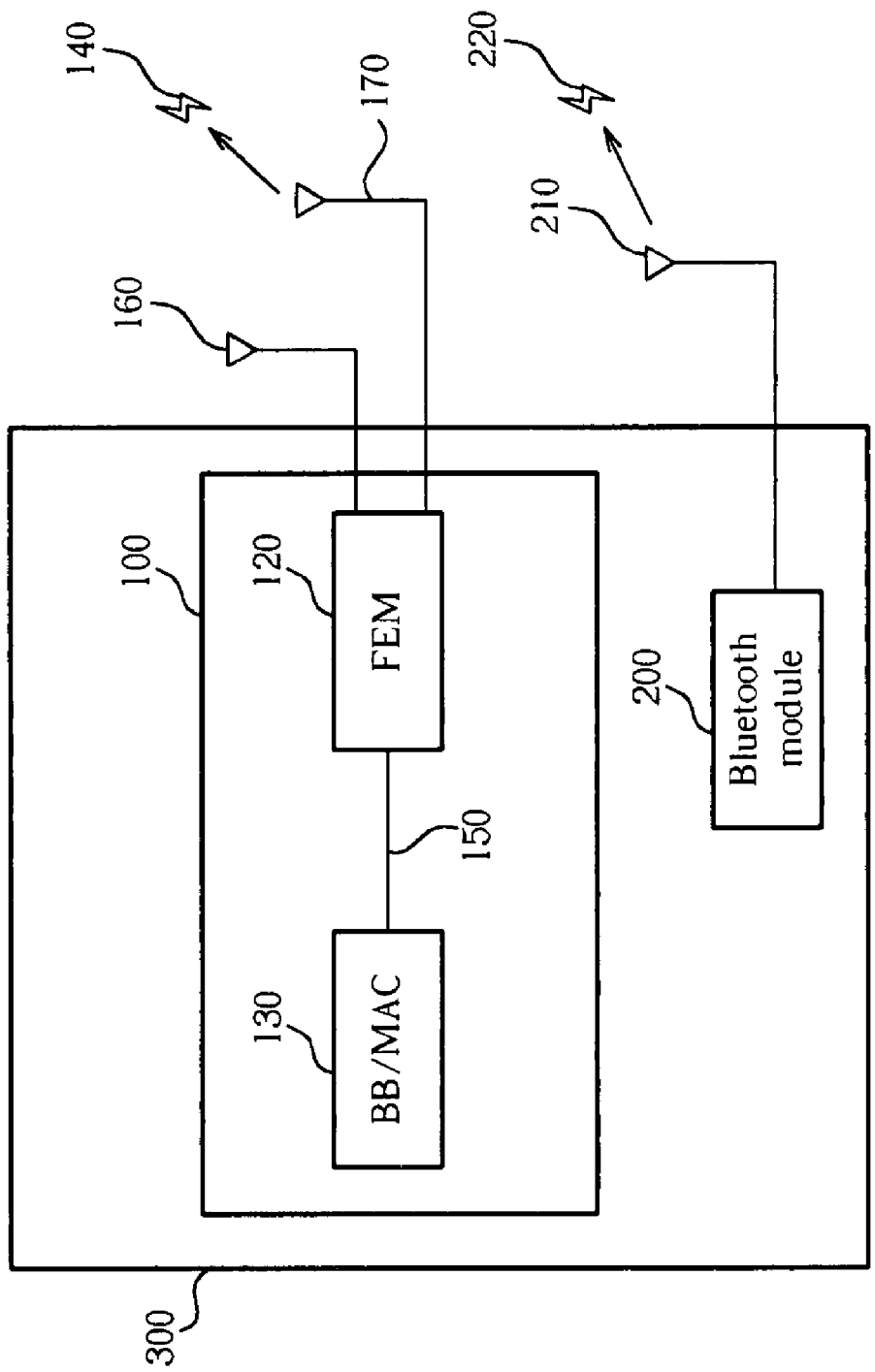
FIG. 3 illustrates a diagram of a communication system according to an embodiment of the present invention.

The present invention is made to solve the problem in the prior art, and to combine the wireless network module and the Bluetooth module on a single printed circuit board. FIG. 3 illustrates a diagram of a communication system 300 according to an embodiment of the present invention. The communication system 300 includes a wireless network module 100 and a Bluetooth module 200. The wireless network module 100 includes a baseband/multimedia access control (BB/MAC) 130, a Front end module (FEM) 120, a main antenna 160, and an auxiliary antenna 170.

Figure 1:
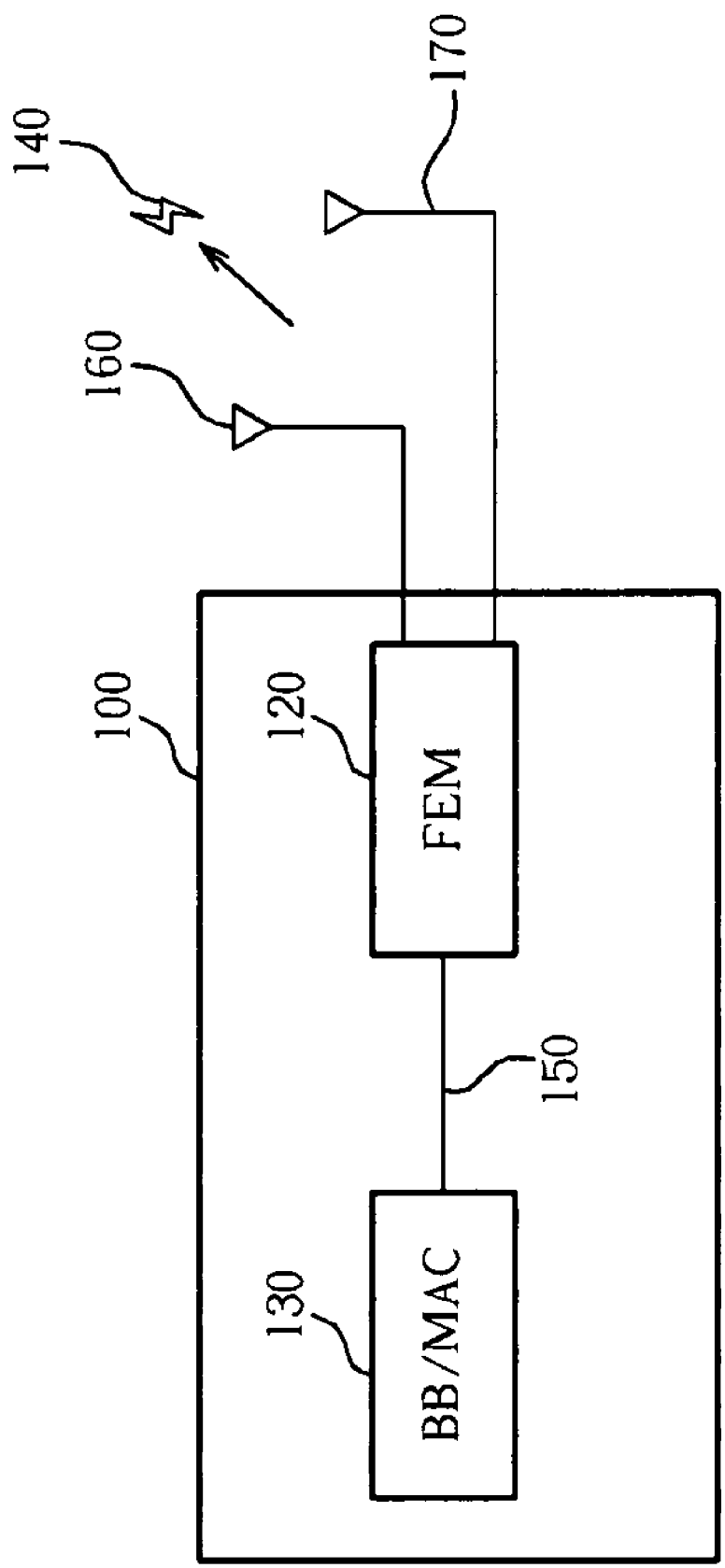
FIG. 1 illustrates a diagram of a convention wireless network module.
Figure 2:
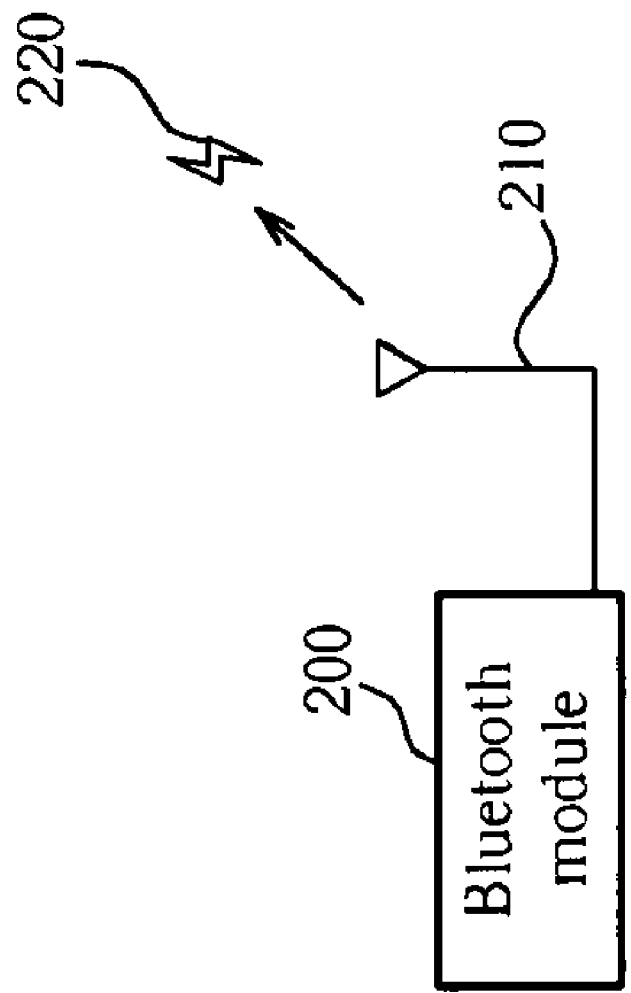
FIG. 2 illustrates a diagram of a conventional Bluetooth module.

The operational method and the connection of the internal components of the wireless network module 100 and the Bluetooth module 200 are similar to FIG. 1, therefore it will not be reiterated. From the above-mentioned, both the wireless network signals 140 transmitted from the wireless network module 100 and the Bluetooth signals 200 transmitted from the Bluetooth module 200 operate in the 2.4 GHz bandwidth. However, when the wireless transmission and receiving range of the wireless network module 100 and the Bluetooth module 200 overlaps, an interference phenomenon will occur, such as a normal interference or a front-end overload.

A normal interference usually occurs on a baseband processor, this is due to the wireless network module 100 and the Bluetooth module 200 not knowing each other's bandwidth, which leads to the two primary frequencies being overlapping on the same channel. The front-end overload occurs when two wireless systems do not keep a certain distance from each other, in other words, it is caused by when isolation of the antenna ends are not sufficient, or a harmonic interference is generated when transmission level is too great from both the wireless systems.

Therefore, when the communication system 300 is being designed, interference can be easily generated due to the insufficient antenna gap between the main antenna 160 of the wireless network module 100, the auxiliary antenna 170, and the Bluetooth antenna 210 of the Bluetooth module 200, hence the transmission efficiency is reduced.

Figure 4:
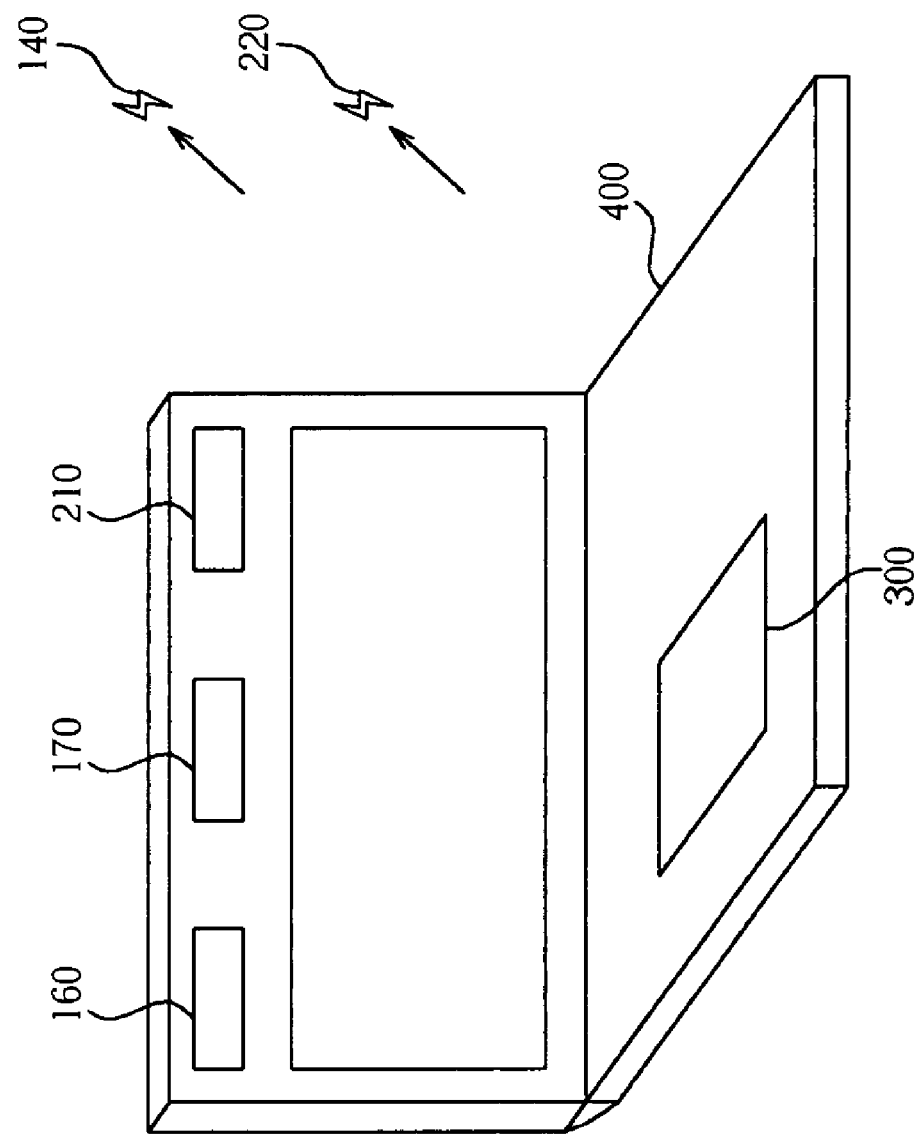
FIG. 4 illustrates a diagram of a communication system being applied in a notebook computer.

FIG. 4 illustrates a diagram of a communication system 300 being applied in a notebook computer 400. In this embodiment, the notebook computer 400 may not have a wireless network module and a Bluetooth module installed, an expansion card that includes a wireless network module and a Bluetooth module can be installed into the notebook computer 400, yet in other embodiments, the communication system 300 can be directly installed on the motherboard of the notebook computer 400.

Whether the communication system 300 is directly installed on the notebook computer 400 or is installed within the expansion card, three antennas are required for receiving and transmitting signals. As the antenna installed on the monitor of the notebook computer 400 will have a better reception, therefore the main antenna 160 of the wireless network module and the auxiliary antenna 170, and the Bluetooth antenna 210 of the Bluetooth module will be installed on the sides of the monitor so that the communication system 300 can transmit the wireless network signals 140 and the Bluetooth signals 220 through the antennas on the top of the monitor.

However, if the installation of main antenna 160, the auxiliary antenna 170, and the Bluetooth antenna 210 on the top end of the monitor will generate an insufficient gap phenomenon at the antenna end such that the communication system 300 at the same time transmits the wireless network signals and Bluetooth signals that can easily cause interference and affect the transmission efficiency.

Therefore, if the number of antennas can be reduced such that the gap degree of the antennas is compliant to 25 dB, 30 dB, or 40 dB, hence there will be better transmission efficiency.

Figure 5:
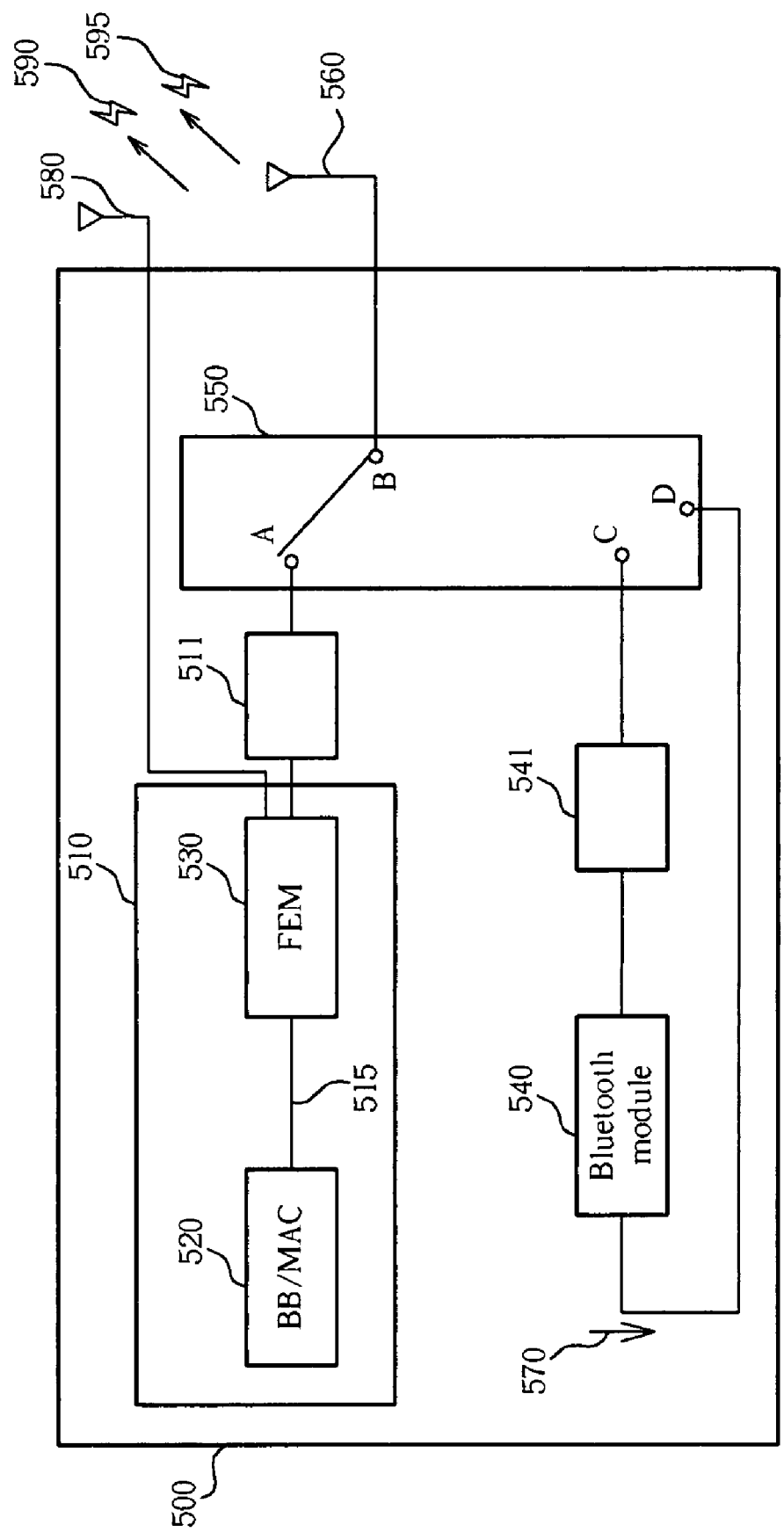
FIG. 5 illustrates a functional block diagram of a communication system according to the first embodiment of the present invention.

Please refer to FIG. 5 for an explanation of a first embodiment of the present invention. FIG. 5 illustrates a functional block diagram of a communication system 500 according to the first embodiment of the present invention. The communication system 500 includes a wireless network module 510, two signal quality enhancers 511 and 541, a Bluetooth module 540, a switch unit 550, a first antenna 580, and a second antenna 560, where the wireless network module 510 includes a BB/MAC 520 and a FEM 530, and the switch unit 550 includes a control end D and transmission ends A, B, and C.

The BB/MAC 520 is coupled to the FEM 530 for transmitting digital signals 515 to the FEM 530. The FEM 530 is coupled to the transmission end A of the switch unit 550 through the signal quality enhancer 511 for converting the digital signals 515 to wireless network signals 590 to be transmitted to the switch unit 550; the FEM 530 is also coupled to the first antenna 580 for transmitting the wireless network signals 590 to the first antenna 580, which to be transmitted. The signal quality enhancer 511 is coupled between the FEM 530 and the transmission end A of the switch unit 550.

The Bluetooth module 540 is coupled to the transmission end C of the switch unit 550 through the signal quality enhancer 541 for transmitting Bluetooth signals 595 to the switch unit 550; the Bluetooth module 540 is also coupled to the control end D of the switch unit 550 for transmitting a control signal 570 to the control end D of the switch unit 550. The signal quality enhancer 541 is coupled between the Bluetooth module 540 and the transmission end C of the switch unit 550.

In this embodiment, the switch unit 550 turns on and off for 2.4 GHz RF, but in other embodiments, the switch unit 550 can also be a switch unit that can switch RF signals.

In this embodiment, the signal quality enhancers 511 and 541 are utilized for enhancing signal quality, for example: the signal quality enhancer 511 is utilized for enhancing the wireless network signal quality, and the signal quality enhancer 541 is utilized for enhancing the Bluetooth signal quality. In this embodiment, the signal quality enhancer 511 and 541 can be filters, but in other embodiments, the signal quality enhancer 511 can be an amplifier, or other equivalent device similar to the signal quality enhancer. In other embodiments, if the wireless network signal quality and the Bluetooth quality are satisfactory, then the signal quality enhancers 511 and 541 can be removed, and the FEM 530 can be directly coupled to the transmission end A of the switch unit 550, and also the Bluetooth module 540 can be directly coupled to the transmission end C of the switch unit 550.

As illustrated in FIG. 5, before the Bluetooth module 540 transmits the Bluetooth signals 595 (when the Bluetooth module 540 is inactive), the transmission ends A and B of the switch unit 550 are coupled (the transmission end C will not be coupled to the transmission end B). Therefore, in FIG. 5, the FEM 530 is coupled to the second antenna 560 through the switch unit 550. Therefore, the wireless network module 510 can transmit the wireless network signals 590 through the first antenna 580 and the second antenna 560. The wireless network module 510 can determine whether the wireless networks signals 590 will be transmitted through the first antenna 580 or the second antenna 560 according to the reception of the first antenna 580 and the second antenna 560.

When the Bluetooth module 540 is transmitting the Bluetooth signals 595, the Bluetooth module 540 will transmit the control signal 570 to the control end D of the switch unit 550 such that the transmission end C of the switch unit 550 is coupled to the transmission end B of the switch unit 550 (at the time, the transmission end A will not be coupled to the transmission end B). Therefore, the Bluetooth module 540 can be coupled to the second antenna 560 through the switch unit 550 to transmit the Bluetooth signals 595. At this time, the wireless network module 510 can transmit the wireless network signals 590 through the first antenna 580.

Furthermore, the communication system 500 provided by the preferred embodiment is designed within a printed circuit board 501, and the printed circuit board 501 is a PCI express card. The express card can be inserted into a PCI express slot of the notebook computer so that the notebook computer has the functions of wireless network (802.11 b/g) and Bluetooth transmission. In the other embodiments, the communication system 500 can be designed within a motherboard of a portable electronic device.

Therefore, the first embodiment of the present invention can solve the interference problem by the two signals (wireless network signals and Bluetooth signals) in the conventional communication system. Furthermore, a communication system 600 provided by the preferred embodiment can reduce number of antennas through a switching method of the multiplier so that the design of the gap degree between the antennas can be simplified, and the interference phenomenon of the wireless network signals and the Bluetooth signals can be reduced so as to increase transmission efficiency.

Figure 6:
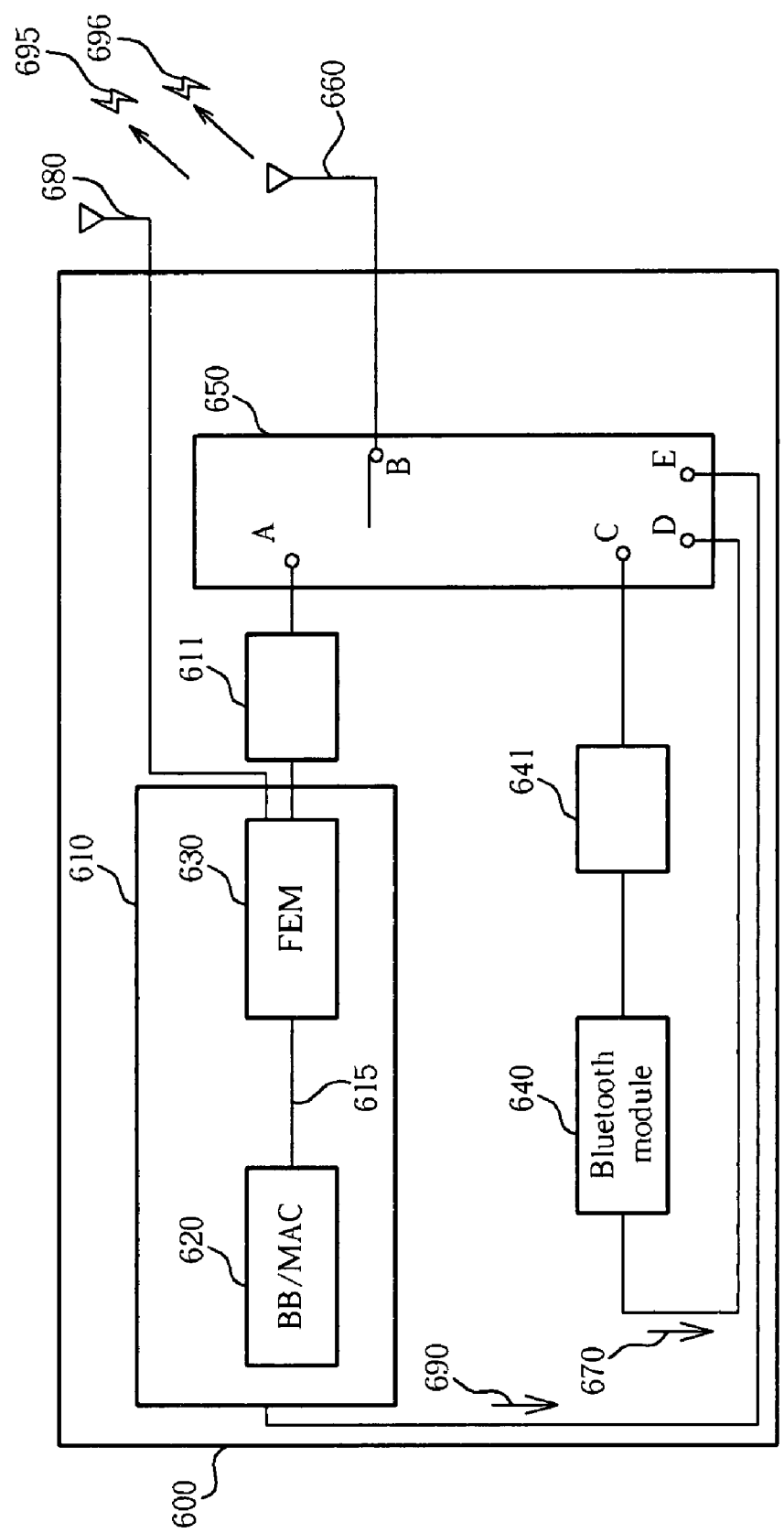
FIG. 6 illustrates a diagram of a communication system according to a second embodiment of the present invention.

FIG. 6 illustrates a diagram of a communication system 600 according to a second embodiment of the present invention. The communication system 600 includes a wireless network module 610, two signal quality enhancers 611 and 641, a Bluetooth module 640, a switch unit 650, a first antenna 680, and a second antenna 660, where the wireless network module 610 includes a BB/MAC 620 and a FEM 630, and the switch unit 650 includes control ends D and E, and transmission ends A, B, and C.

The connections and functions of the components disclosed in the above-mentioned embodiment are similar to the first embodiment, except that the wireless network module 610 is coupled to the control end E of the switch unit 650 to transmit an active control signal 690 to the control end E of the switch unit 650.

As illustrated in FIG. 6, before the wireless network module 610 and the Bluetooth module 640 respectively transmit the wireless network signals 695 and the Bluetooth signals 696, the transmission end B of the switch unit 650 may not be coupled to the transmission ends A and C. When the wireless network module 610 is transmitting the wireless network signals 695, the wireless network module 610 will transmit the control signal 690 to the control end E of the switch unit 650 such that the transmission end B is coupled to the transmission end A and also the FEM 630 can be coupled to the second antenna 660 through the switch unit 650. Thus the wireless network module 610 can transmit the wireless network signals 695 through the first antenna 680 or the second antenna 660, in other words, the wireless network module 610 can determine whether the wireless networks signals 695 will be transmitted through the first antenna 680 or the second antenna 660 according to the reception of the first antenna 680 and the second antenna 660.

When the Bluetooth module 640 is transmitting the Bluetooth signals 696, the Bluetooth module 640 will transmit a control signal 670 to the control end D of the switch unit 650 such that the transmission end C is coupled to the transmission end B of the switch unit 650. Therefore the Bluetooth module 640 can be coupled to the second antenna 660 through the switch unit 650 to transmit the Bluetooth signals 696.

Please note that in this preferred embodiment, when the wireless network module 610 and the Bluetooth module 640 respectively transmit the wireless network signals 695 and the Bluetooth module 696 at the same time, the wireless network module 610 and the Bluetooth module 640 will respectively transmit the control signals 690 and 670 to the control ends E and D of the switch unit 650. At this time, after the switch unit 650 receives the control signals 690 and 670, the switch unit 650 executes the switch so that the transmission end B is coupled to the transmission end C, hence the Bluetooth module 640 can transmit the Bluetooth signal 696 through the second antenna 660, and the wireless network module 610 can still transmit the wireless network signals 695 through the first antenna 680.

In other words, in this preferred embodiment, priority of the Bluetooth module 640 utilizing the second antenna 660 is higher than the wireless network module 610. The reason for the design is that the main application of the Bluetooth module 640 is the transmission of voice signals, and the main application of the wireless network module 610 is the transmission of data. Also the priority of transmitting voice signals is usually higher than the priority of transmitting data in order to prevent the voice signals from being interrupted during broadcast. Therefore, the Bluetooth module 640 has a higher priority in utilizing the second antenna 660.

In other embodiments, other conditions are taken into consideration, such that the wireless network module 610 has a higher priority to utilize the second antenna 660. Then if the switch unit 650 at the same time receives the control signals 690 and 670, the switch unit 650 will couple the transmission end B to the transmission end A.

Therefore the communication system 600 provided by the preferred embodiment can reduce the number of antennas through a switching method of the switch unit so that the design of the gap degree between the antennas can be simplified, and the interference phenomenon of the wireless network signals and the Bluetooth signals can be reduced.

Figure 7:
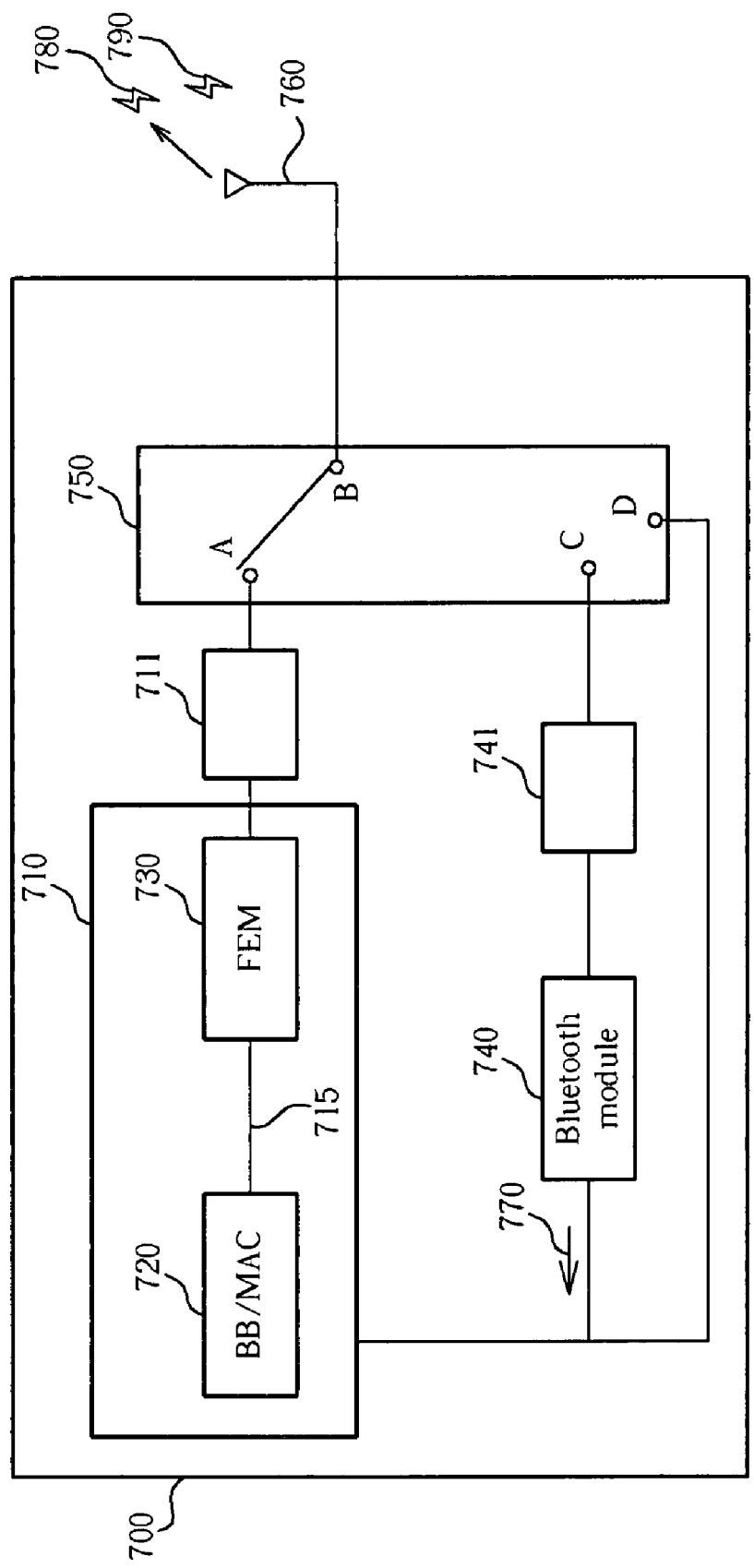
FIG. 7 illustrates a diagram of a communication system according to a third embodiment of the present invention.

FIG. 7 illustrates a diagram of a communication system 700 according to a third embodiment of the present invention. The communication system 700 includes a wireless network module 710, two signal quality enhancers 711 and 741, a Bluetooth module 740, a switch unit 750, an antenna 760, where the wireless network module 710 includes a BB/MAC 720 and a FEM 730, and the switch unit 750 includes a control end D, and transmission ends A, B, and C.

The connections and functions of the components disclosed in the above-mentioned embodiment are similar to the first embodiment, except that the design of the above-mentioned embodiment utilizes a single antenna design, therefore the wireless network module 710 and the Bluetooth module 740 are only coupled to the control end D of the switch unit 750. Furthermore, in the initial stage (when the Bluetooth module 740 is not transmitting the Bluetooth signals 790, and the Bluetooth module 740 is inactive), the transmission end A of the switch unit 550 is coupled to the transmission end B (the transmission C is not coupled to the transmission B). Hence the FEM 730 can be coupled to the antenna 760 through the switch unit 750, therefore the wireless network module 710 can transmit the wireless network signals 780 through the antenna 760.

When the Bluetooth module 740 is transmitting the Bluetooth signals 790, the Bluetooth module 740 will transmit a control signal 770 to the control end D of the switch unit 750 and the wireless network module 710. After the switch unit 750 receives the control signals 770, the switch unit 750 will couple the transmission end C to the transmission end B (at this time, the transmission end A is not coupled to the transmission end B). Furthermore, the control signal 770 at the same time also notifies the wireless network module 710 to temporarily stop transmitting the wireless network signals 780. Whereby the Bluetooth module 740 can be coupled to the antenna 760 through the switch unit 750 to transmit the Bluetooth signals 790.

Figure 8:
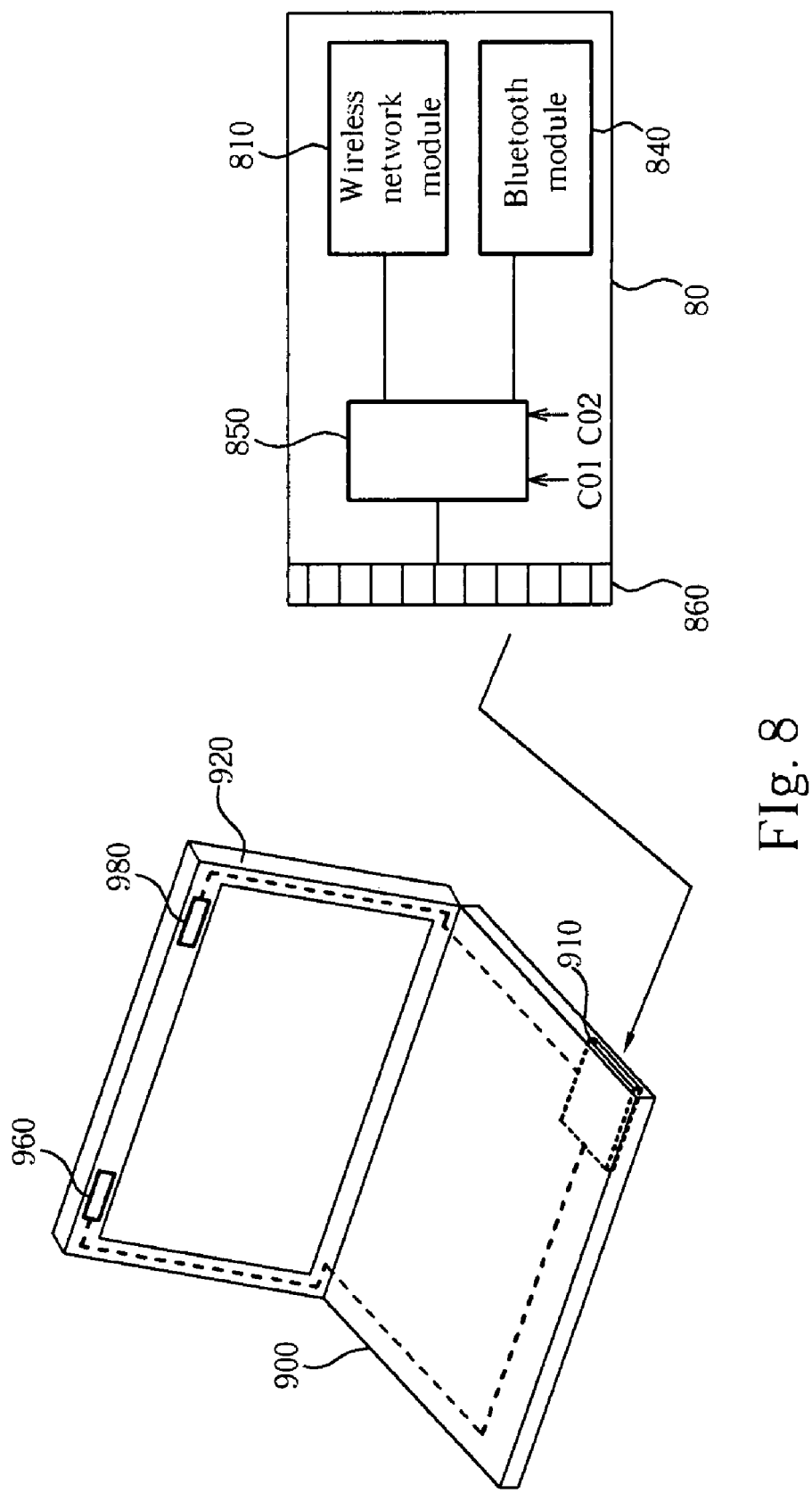
FIG. 8 illustrates a diagram of an expansion card according to a fourth embodiment of the present invention.

The wireless network module, the Bluetooth module, and the switch unit of the above-mentioned embodiment can be integrated within an expansion card. Please refer to FIG. 8 for further explanation. FIG. 8 illustrates a diagram of an expansion card according to a fourth embodiment of the present invention.

As illustrated in FIG. 8, an expansion card 80 includes a wireless network module 810, a Bluetooth module 840, a switch unit 850, and an interface unit 860. In this embodiment, the expansion card 80 is a PCI Express card, while in other embodiments, the expansion card 80 can be a PCMCIA card or other types of expansion card.

The above-mentioned wireless network module 810 is respectively coupled to the switch unit 850 and the interface unit 860. The switch unit 850 is respectively coupled to the wireless network module 810, the Bluetooth module 840, and the interface unit 860.

The above-mentioned expansion card 80 is utilized for inserting into an expansion slot 910 of a portable electronic device 900. A first antenna 960 and a second antenna 980 are installed on a monitor 920 of the portable electronic device 900. The first antenna 960 and the second antenna 980 are installed on a top end of the monitor 920, and the first antenna 960 and the second antenna 980 are coupled to the expansion slot 910. In this embodiment, the portable electronic device 900 can be a laptop or notebook computer, a palmtop, a tablet PC, an origami, or a personal digital assistant (PDA).

When the expansion card 80 is inserted into the expansion slot 910 of the portable electronic device 900, the Bluetooth module 840 is coupled to the first antenna 960 through the switch unit 850, the interface unit 860, and the expansion slot 910, whereby either the wireless network module 810 or the Bluetooth module 840 can transmit the Bluetooth signals or the wireless network signals through a switching method of the switch unit 850 and through the first antenna 960.

Furthermore, when the expansion card 80 is inserted into the expansion slot 910, the wireless network module 810 is coupled to the second antenna 980 through the interface unit 860 and the expansion slot 910, therefore the wireless network module 810 can transmit the wireless network signals through the second antenna 980. When the quality of the wireless network signals transmitted by the wireless network module 810 through the second antenna 980 is bad, the wireless network module 810 will output a control signal C02 to the switch unit 850 to control the switching of the switch unit 850 so that the wireless network module 810 can transmit the wireless network signals through the first antenna 960.

Next, if the Bluetooth module 840 intends to transmit the Bluetooth signals through the first antenna 960, then the Bluetooth module 840 will output a first control signal C01 to the switch unit 850 to control the switching of the switch unit 850 so that the Bluetooth module 840 can transmit the Bluetooth signals through the first antenna 960. Thus the wireless network module 810 can process the wireless networks through the second antenna 980, and the Bluetooth module 840 can process the Bluetooth signals through the first antenna 960.

Through the design of this embodiment, the number of antennas can be reduced, and the portable electronic device 900 requires only the first antenna 960 and the second antenna 980 to be installed on each side on the top end of the monitor 920. In this way, the positioning problem of the first antenna 960 and the second antenna 980 can be solved, and also the interference problem between the wireless signals can be solved.

In conclusion, the communication system provided by the above-mentioned embodiment utilizes the switch unit to control the transmission and receiving of the antennas. Hence the number of antennas can be reduced, and also the interference phenomenon of the wireless network signals and the Bluetooth signals can be prevented.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An expansion card suitable for cooperating to a first antenna on a portable electronic device, the expansion board comprising:
   a first communication module for processing a first communication signal;
   a second communication module for processing a second communication signal; and
   a switch unit respectively coupled to the first communication module and the second communication module, wherein when the expansion card is inserted to the portable electronic device, the switch unit is coupled to the first antenna, and the switch unit switches the first communication module or the second communication module through the first antenna to transit the first communication signal or the second communication signal.

2. The expansion card of claim 1 wherein the first communication module is a Bluetooth module.

3. The expansion card of claim 1 wherein the second communication module is a wireless network module.

4. The expansion card of claim 1 wherein the first communication module outputs a first control signal to the switch unit to control the switch unit switching so that the first communication module transmits the first communication signal through the first antenna.

5. The expansion card of claim 1 wherein the second communication module is coupled to a second antenna on the portable electronic device, and the second communication module transmits the second communication signal through the second antenna.

6. The expansion card of claim 5 wherein when quality of the second communication signal transmitted by the second communication module through the second antenna is poor, the second communication module outputs a second control signal to the switch unit to control the switch unit switching so that the second communication module transmits the second communication signal through the first antenna.

7. The expansion card of claim 1 wherein the expansion card is a PCI Express card.

8. A communication system with a shared antenna, the communication system comprising:
   an antenna;
   a first communication module for processing a first communication signal;
   a second communication module coupled to the first communication module for processing a second communication signal and for receiving a first control signal transmitted from the first communication module; and
   a switch unit comprising:
      a first transmission end coupled to the first communication module for transmitting the first communication signal;
      a second transmission end coupled to the second communication module for transmitting the second communication signal;
      a first control end coupled to the first communication module for receiving the first control signal transmitted from the first communication module; and
      a third transmission end coupled to the antenna for coupling to the first transmission end or the second transmission end according to the first control signal.

9. The communication system of claim 8 wherein the first communication module is a Bluetooth module.

10. The communication system of claim 8 wherein the second communication module is a wireless network module.

11. A communication system with a shared antenna, the communication system comprising:
   a first antenna;
   a first communication module for processing a first communication signal;
   a second communication module for processing a second communication signal;
   a second antenna coupled to the second communication module for transmitting the second communication signal; and
   a switch unit comprising:
      a first transmitting end coupled to the first communication module for transmitting the first communication signal;
      a second transmitting end coupled to the second communication module for transmitting the second communication signal;
      a first control end coupled to the first communication module for receiving the first control signal transmitted from the first communication module; and
      a third transmitting end coupled to the first antenna for coupling to the first transmission end or the second transmission end according to the first control signal.

12. The communication system of claim 11 wherein the first communication module is a Bluetooth module.

13. The communication system of claim 11 wherein the second communication module is a wireless network module.

14. The communication system of claim 11 wherein the switch unit further comprises a second control end coupled to the second communication module for receiving a second control signal transmitted from the second communication module so that the third transmission end couples to the first transmission end or the second transmission end according to the first control signal and the second control signal.

* * * * *